US009798877B2

(12) United States Patent
Mulchandani (10) Patent No.: US 9,798,877 B2
(45) Date of Patent: Oct. 24, 2017

(54) SECURITY RISK-BASED RESOURCE ALLOCATION

(71) Applicant: Accenture Global Services Limited, Dublin (IE)

(72) Inventor: Shaan Mulchandani, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 147 days.

(21) Appl. No.: 14/838,855

(22) Filed: Aug. 28, 2015

(65) Prior Publication Data

US 2016/0357961 A1    Dec. 8, 2016

Related U.S. Application Data

(60) Provisional application No. 62/171,142, filed on Jun. 4, 2015.

(51) Int. Cl.
*G06F 21/55* (2013.01)
*G06F 9/50* (2006.01)

(52) U.S. Cl.
CPC .......... *G06F 21/554* (2013.01); *G06F 9/5038* (2013.01)

(58) Field of Classification Search
None
See application file for complete search history.

(56) References Cited

U.S. PATENT DOCUMENTS

| 5,528,513 A * | 6/1996 | Vaitzblit ........... H04L 29/06027 348/E7.073 |
| 7,219,347 B1 * | 5/2007 | Waddington .......... G06F 9/4881 718/102 |
| 7,669,087 B1 * | 2/2010 | Johnsen ................ G06F 11/008 714/13 |
| 7,779,410 B2 * | 8/2010 | Gebhart ................ G06F 9/4856 717/177 |
| 8,171,545 B1 | 5/2012 | Cooley et al. |
| 2009/0165133 A1 * | 6/2009 | Hwang .................. G06F 21/53 726/22 |

(Continued)

FOREIGN PATENT DOCUMENTS

WO    WO 2004077710 A2 *    9/2004    ............ H04L 51/12

OTHER PUBLICATIONS

International Search Report and Written Opinion in International Application No. PCT/IB2016/052463, dated Jul. 8, 2016, 11 pages.

(Continued)

*Primary Examiner* — Michael R Vaughan
(74) *Attorney, Agent, or Firm* — Fish & Richardson P.C.

(57) ABSTRACT

Methods, systems, and apparatus, including computer programs encoded on a computer storage medium, for allocating resources to processes based on security risk. The methods include actions of receiving a request from a process executing on a system for an allocation of resources and identifying other processes executing on the system. Additional actions include determining, for each of the processes, a risk score that reflects a likelihood that the process is a malicious process and determining a resource allocation priority based on the risk scores of each of the processes. Further actions include allocating resources to the processes based on the resource allocation priority.

20 Claims, 5 Drawing Sheets

(56) References Cited

U.S. PATENT DOCUMENTS

| | | | |
|---|---|---|---|
| 2009/0276783 A1* | 11/2009 | Johnson | G06F 9/5077 |
| | | | 718/104 |
| 2009/0328209 A1 | 12/2009 | Nachenberg | |
| 2012/0005115 A1* | 1/2012 | Hofberg | G06Q 10/06 |
| | | | 705/348 |
| 2013/0283373 A1* | 10/2013 | Zisapel | H04L 63/1441 |
| | | | 726/22 |
| 2015/0101049 A1 | 4/2015 | Lukacs et al. | |
| 2016/0147564 A1* | 5/2016 | Marr | G06F 9/5027 |
| | | | 718/103 |
| 2016/0224380 A1* | 8/2016 | Wang | G06F 9/5011 |
| 2016/0357961 A1* | 12/2016 | Mulchandani | G06F 9/5038 |

OTHER PUBLICATIONS

Shafeeq and Hareesha, "Dynamic Clustering of Data with Modified K-Means Algorithm," ICICN 2012, pp. 221-225 (2012).

Peng et al., "A Dynamic Clustering Algorithm Based on Small Data Set," CGIV '09, pp. 410-413 (2009).

* cited by examiner

SECURITY RISK-BASED RESOURCE ALLOCATION

CROSS-REFERENCE TO RELATED APPLICATIONS

This application claims the benefit of U.S. Provisional Patent Application No. 62/171,142, filed Jun. 4, 2014, the entirety of which is hereby incorporated by reference.

TECHNICAL FIELD

This disclosure generally describes techniques relating to computer security.

BACKGROUND

Computers may execute malicious processes that consume resources. For example, malicious processes may use main memory, processing power, or disk space of computers. The consumption of resources by malicious processes may make those resources unavailable for use by legitimate processes, negatively impacting execution of legitimate processes.

SUMMARY

In general, an aspect of the subject matter described in this specification may involve a process or methodology for allocating resources to processes based on a process's perceived security risk. A system may identify processes executing on the system. For each identified process, the system may determine the likelihood that the process is a malicious process based on one or more of the process' characteristics. The system may then generate a resource allocation priority based on the likelihoods that the processes are malicious process. The resource allocation priority may then be used by the system to allocate resources to the processes. Accordingly, the system may prioritize allocating resources to processes less likely to be malicious processes over processes more likely to be malicious processes, and may prohibit allocation of resources to processes deemed likely malicious in the event of resource scarcity.

In some aspects, the subject matter described in this specification may be embodied in methods that may include the actions of receiving a request from a process executing on a system for an allocation of resources, identifying other processes executing on the system, determining, for each of the processes, a risk score that reflects a likelihood that the process is a malicious process, determining a resource allocation priority based on the risk scores of each of the processes, and allocating resources to the processes based on the resource allocation priority.

Other versions include corresponding systems, apparatus, and computer programs, configured to perform the actions of the methods, encoded on computer storage devices.

These and other versions may each optionally include one or more of the following features. For instance, in some implementations allocating resources to the processes based on the resource allocation priority includes determining an availability of resources on the system and allocating the resources to the processes based on the availability of resources on the system and the resource allocation priority.

In certain aspects, allocating the resources to the processes based on the availability of resources on the system and the resource allocation priority includes determining that the availability of resources on the system is insufficient to fulfill the request and maintain an allocation of resources for the other processes, in response to determining that the availability of resources on the system is insufficient to fulfill the request and maintain an allocation of resources for the other processes, determining that the resource allocation priority indicates that the process has a lower priority than the other processes, and in response to determining that the resource allocation priority indicates that the process has a lower priority than the other processes, rejecting or queueing the request from the process.

In some aspects, allocating the resources to the processes based on the availability of resources on the system and the resource allocation priority includes determining that the availability of resources on the system is insufficient to fulfill the request and maintain an allocation of resources for the other processes, in response to determining that the availability of resources on the system is insufficient to fulfill the request and maintain an allocation of resources for the other processes, determining that the resource allocation priority indicates that the process has a higher priority than another process, in response to determining that the resource allocation priority indicates that the process has a higher priority than another process, determining whether reducing a resource allocation of the other process enables the system to fulfill the request from the process. Additional actions include, in response to determining that reducing the resource allocation of the other process enables the system to fulfill the request from the process without causing integrity or security concerns, reducing the resource allocation of the other process and fulfilling the request from the process. In some implementations, reducing the resource allocation of the other process includes suspending or securely terminating the other process.

In certain aspects, determining a resource allocation priority based on the risk scores of each of the processes includes determining a resource allocation priority that prioritizes resource allocation for processes with risk scores that reflect a low likelihood that the process is a malicious process over processes with risk scores that reflect a high likelihood that the process is a malicious process.

In some aspects, determining a resource allocation priority based on the risk scores of each of the processes includes classifying the processes into clusters based on the risk scores and determining the resource allocation priority based on the clusters.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
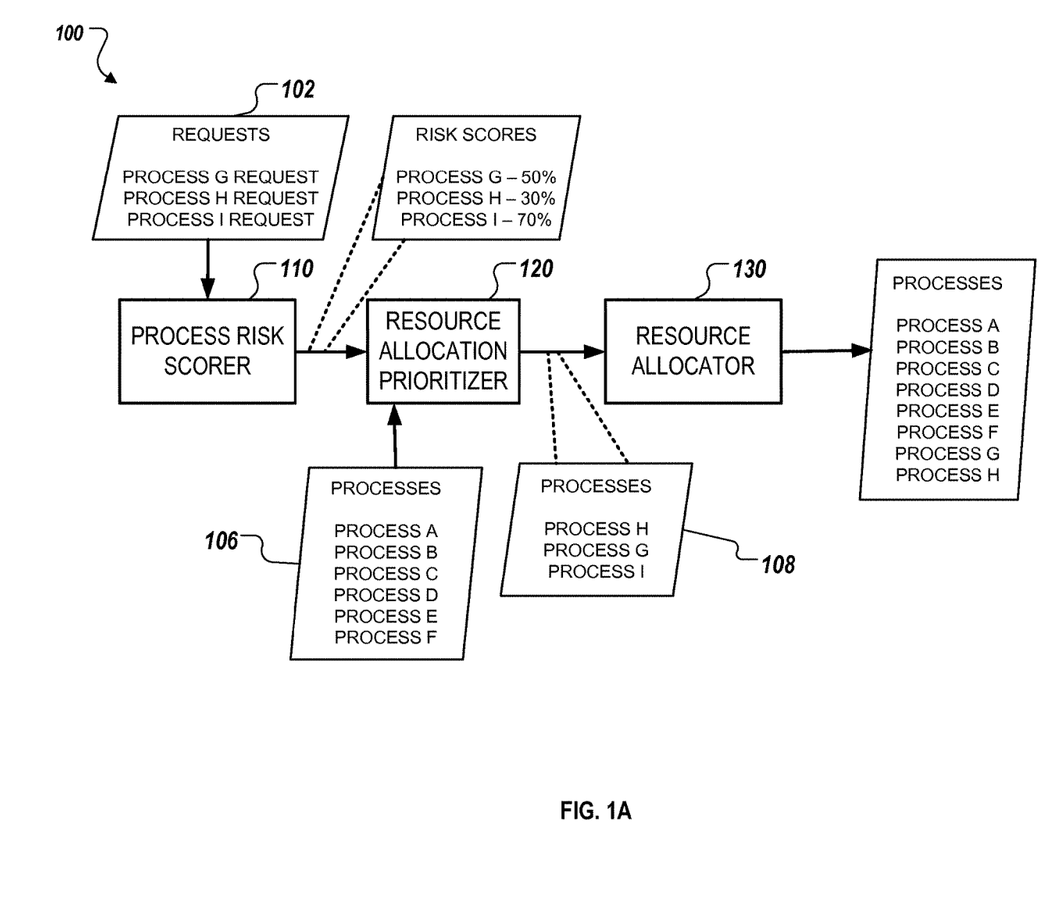
FIGS. 1A-1C are block diagrams of example systems for allocating resources to processes based on security risk.

FIG. 1A is a block diagram of an example system 100 for allocating resources to processes based on security risk.

Briefly, and as described in further detail below, the system 100 may include a process risk scorer 110, a resource allocation prioritizer 120, and a resource allocator 130.

The process risk scorer 110 may determine risk scores for processes executing on the system 100. For example, the process risk scorer 110 may determine a first risk score for a first process executing on the system 100 and a second risk score for a second process executing on the system 100. A risk score of a process may reflect a likelihood that the process is a malicious process. For example, an integral process of an operating system may have a risk score of 0% that reflects that the process has no likelihood of being a malicious process. In another example, a process that has never been seen before may have a baseline risk score of 50% that reflects a moderate likelihood that the process is a malicious process. A baseline risk score may be a default risk score assigned to processes for which characteristics can not be examined or verified. Other baseline risk scores may be 30%, 70%, or some other amount set by a system administrator. In yet another example, a known malicious process may have a risk score of 100% that reflects a high likelihood that the process is a malicious process. In still another example, the process risk scorer 110 may determine a risk score for a process based on characteristics of the process, e.g. name, hash of the file, resources requested, number of times run before, average of resources requested per run over the process' history and how it compares, e.g., what is the delta, to resources requested now, how many people have run this process before, and other information.

The process risk scorer 110 may determine risk scores for processes executing on the system 100 in response to a request from a process for allocation of resources. For example, the process risk scorer 110 may receive multiple requests 102 including a request from "Process G" for an allocation of 2 GB of main memory, a request from "Process H" for an allocation of 1.5 GB of main memory, and a request from "Process I" for an allocation of 1 GB of main memory.

In response to receiving the requests 102, the process risk scorer 110 may determine risk scores for each of the processes. For example, the process risk scorer 110 may determine a risk score for each of Process G, H, and I. The process risk scorer 110 may determine the risk score for a process based on comparing the process with previously scored processes. For example, the process risk scorer 110 may determine a name of a process executing on the system 100 matches the name of a process stored in a table mapping process names to risk scores, and determine the risk score of the process executing on the system 100 is the risk score in the table for the matching process name. In another example, the process risk scorer 110 may determine a hash of a process executing on the system 100 matches the hash of a process stored in a table mapping hashes to risk scores, and determine the risk score of the process executing on the system 100 is the risk score in the table for the matching hash.

In another example, the process risk scorer 110 may calculate a risk score for the processes based on characteristics of the process. For example, the process risk scorer 110 may calculate a risk score for a process based on memory usage of the process, read and write activity of the process, frequency of execution of the process, currently running parent processes, number of sibling processes, and other characteristics of the process. In a particular example, the process risk scorer 110 may exponentially increase a risk score for a process as the process more frequently makes requests for resources.

The process risk scorer 110 may provide an indication of the multiple requests along with risk scores for each of the processes making a request to the resource allocation prioritizer 120. For example, the process risk scorer 110 may provide, to the resource allocation prioritizer 120, an indication that Processes G-I are associated with risk scores of 50%, 30%, and 70%, respectively, and an indication that "Process G" is requesting 2 GB of main memory, "Process H" is requesting 1.5 GB of main memory, and "Process I" is requesting 1 GB of main memory.

The resource allocation prioritizer 120 may receive an indication of the requests and risk scores from the process risk scorer 110, and determine a resource allocation priority. For example, the resource allocation prioritizer 120 may receive an indication that Processes G-I are associated with risk scores of 50%, 30%, and 70%, respectively, and an indication that "Process G" is requesting 2 GB of main memory, "Process H" is requesting 1.5 GB of main memory, and "Process I" is requesting 1 GB of main memory, and determine a resource allocation priority 108 that indicates that the priority for resource allocation of the processes making requests is "Process H," "Process G," and "Process I," in order by highest priority to lowest priority.

The resource allocation prioritizer 120 may determine the resource allocation priority based on the risk scores of the processes. For example, the resource allocation prioritizer 120 may determine the resource allocation priority 108 that indicates that processes that have risk scores that reflect a lower likelihood that the process is a malicious process have a higher priority than a priority of processes that have risk scores that reflect a higher likelihood that the process is a malicious process. The resource allocation prioritizer 120 may determine the resource allocation priority based on ranking the processes by risk score, and then determining the priority for allocation resources to the processes based on the ranking of the processes. For example, the resource allocation prioritizer 120 may rank "Process H" with a 30% risk score higher than "Process G" with a 50% risk score, and accordingly, determine "Process H" should have a higher priority for resource allocation than "Process G."

The resource allocation prioritizer 120 may provide the resource allocation priority to the resource allocator 130. For example, the resource allocation prioritizer 120 may provide, to the resource allocator 130, the resource allocation priority 108 that indicates that "Process H" has a highest priority, followed by "Process G" and "Process I".

The resource allocator 130 may receive the resource allocation priority and the request, and determine resource allocations. For example, the resource allocator 130 may determine to allocate resources to fulfill the request for Process H and G, but not fulfill the request for Process I. In another example, the resource allocator 130 may determine to allocate resources to fulfill the request for Process H, but not to allocate resources to fulfill the requests for Process G and I.

The resource allocator 130 may allocate physical and/or virtual resources based on an availability of resources on the system 100. For example, the resource allocator 130 may either directly or virtually, e.g., via address space mappers/translators and indexing in general, or in conjunction with other specific techniques, allocate main memory, e.g., either directly or virtually, based on an amount of main memory that has not already been allocated to processes executing on the system 100. A resource may be considered available if it is not already currently allocated to a process. For example, if a system 100 has 16 GB of main memory and 10 GB of the main memory has been allocated to executing processes, the system 100 may be considered to have 6 GB of the main memory available.

In response to receiving requests, the resource allocator 130 may determine the resource requested and determine an availability of the resource. For example, in response to receiving the requests for 2 GB of main memory, 1.5 GB of main memory, and 1 GB of main memory, the resource allocator 130 may determine that main memory is requested, and determine that the system 100 has available 4 GB of main memory. In another example, in response to receiving a request for central processing unit (CPU) utilization, the resource allocator 130 may determine that 90% of the CPU processing ability is being used, and determine that the system 100 has available 10% of the CPU processing ability. In another example, the resource allocator 130 may determine that 90% of the maximum number of threads that the system 100 may use are currently being used, and determine that the system 100 has available 10% of the maximum number of threads.

The resource allocator 130 may allocate resources based on whether the availability of the resource requested is sufficient to fulfill the requests. For example, the resource allocator 130 may allocate resources in response to the requests for 2 GB, 1.5 GB, and 1 GB of main memory based on determining whether 4 GB of main memory available is sufficient to fulfill all the requests. If the resource allocator 130 determines that the availability of the resource requested is sufficient to fulfill all the requests, the resource allocator 130 may fulfill all the requests regardless of the priority of the processes making the requests as indicated by the resource allocation priority. For example, if the resource allocator 130 determines that the 6 GB of main memory available is sufficient to fulfill all the requests 102 for 2 GB, 1.5 GB, and 1 GB of main memory, the resource allocator 130 may fulfill the requests regardless of the priorities of the processes making the requests.

If the resource allocator 130 determines that the availability of the resource requested is insufficient to fulfill the requests, the resource allocator 130 may allocate resources based on the resource allocation priority. For example, if the resource allocator 130 receives the requests for 2 GB, 1.5 GB, and 1 GB of main memory and determines that only 4 GB of main memory is available and 4 GB is insufficient to fulfill the requests, the resource allocator 130 may allocate resources based on the resource allocation priority and fulfill the requests for Process H and G, but not Process I.

When allocating resources based on the resource allocation priority, the resource allocator 130 may determine whether to fulfill a request of the requests in order of priority of the processes associated with the request. For example, the resource allocator 130 may first determine whether 4 GB of main memory is enough to fulfill the request for 2 GB of main memory from Process H, with the highest priority, determine that 4 GB of main memory is enough to fulfill the request, in response, allocate 2 GB of main memory to Process H, then determine whether 2 GB of main memory is enough to fulfill the request for 1.5 GB of main memory from Process G, with the second most highest priority, determine that 2 GB of main memory is enough to fulfill the request, in response, allocate 1.5 GB of main memory to Process G, determine whether 0 GB of main memory is enough to fulfill the request for 1 GB of main memory from Process I, with the third most highest priority, determine that 0 GB is not enough, and in response, not fulfill the request from Process I.

In determining not to fulfill a request, the resource allocator 130 may queue the request for later fulfillment when more resources become available. For example, in response to determining not to fulfill a request from "Process I," the resource allocator 130 may queue the request for 1 GB of main memory for "Process I" and fulfill the request once the system determines that 1 GB of main memory is available. In some implementations, queued requests may be prioritized. For example, if the resource allocator 130 later receives a request for "Process G" for 1 GB of main memory, determines that 1 GB of main memory is available and that "Process G" is associated with a higher priority than "Process H," which already has a previously queued request for 1 GB, the resource allocator 130 may determine to first fulfill the request for "Process G" when 1 GB of main memory becomes available as "Process G" has a higher priority than "Process H."

Different configurations of the system 100 may be used where functionality of the process risk scorer 110, the resource allocation prioritizer 120, and the resource allocator 130 may be combined, further separated, distributed, or interchanged. The system 100 may be implemented in a single device or distributed across multiple devices.

Figure 1B:
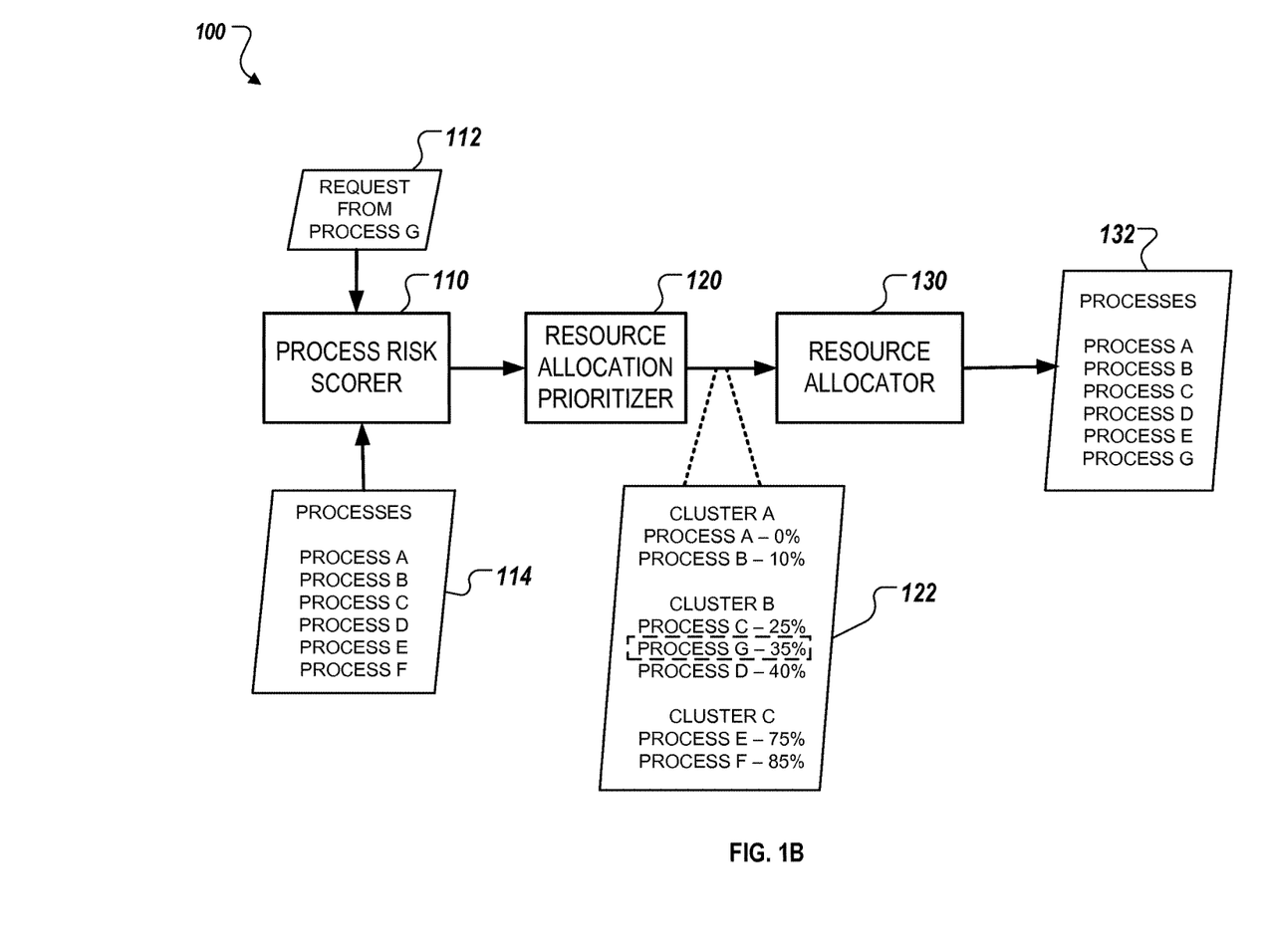

FIG. 1B is a block diagram of an example system 100 for allocating resources to processes based on security risk. Briefly, and as described in further detail below, the system 100 may include a process risk scorer 110, a resource allocation prioritizer 120, and a resource allocator 130. In the example, the system 100 may reduce an allocation of resources to existing processes.

The process risk scorer 110 may determine risk scores for processes executing on the system 100 in response to a request from a process for allocation of resources. For example, the process risk scorer 110 may receive a request 112 from "Process G" for an allocation of 2 GB of main memory. In response to receiving a request for resources from a process, the process risk scorer 110 may identify other processes executing on the system 100. For example, in response to receiving the request 112 from "Process G" for an allocation of 2 GB of main memory, the process risk scorer 110 may identify or maintain a list 114 of processes that indicates that Processes A-F are executing on the system 100.

The process risk scorer 110 may determine risk scores for each of the identified processes. For example, the process risk scorer 110 may determine a risk score for "Process G" that is requesting the resource and each of Processes A-F executing on the system 100.

The process risk scorer 110 may provide an indication of the processes executing on the system 100, the associated risk scores of the processes executing on the system 100, and the request to the resource allocation prioritizer 120. For example, the process risk scorer 110 may provide, to the resource allocation prioritizer 120, an indication that Processes A-G are executing on the system 100 and are associated with risk scores of 0%, 10%, 25%, 40%, 75%, 85%, and 35%, respectively, and an indication that "Process G" is requesting 2 GB of main memory.

In some implementations, in response to a request from a process, the process risk scorer 110 may provide just a risk score for the process to the resource allocation prioritizer 120 which may already maintain a list of existing processes already running and their associated risk scores, where the risk scores of the existing processes may have previously been provided by the process risk scorer 110 when those existing processes provided requests for resources. For example, in response to the request 112 from "Process G,"

the process risk scorer 110 may just provide a risk score of 35% for "Process G," where the process risk scorer 110 previously provided risk scores of 0%, 10%, 25%, 40%, 75%, 85% for Processes A-F to the resource allocation prioritizer 120 in response to requests previously received from Processes A-F.

The resource allocation prioritizer 120 may receive an indication of the processes executing on the system 100, the associated risk scores of the processes executing on the system 100, and the request from the process risk scorer 110, and determine a resource allocation priority. For example, the process risk scorer 110 may provide to the resource allocation prioritizer 120 an indication that Processes A-G are executing on the system 100 and are associated with risk scores of 0%, 10%, 25%, 40%, 75%, 85%, and 35%, respectively, and an indication that "Process G" is requesting 2 GB of main memory, and determine a resource allocation priority 122 that indicates that the priority of the processes for resource allocation is "Process A," "Process B," "Process C," "Process G," "Process D," "Process E," and "Process F," in order by highest priority to lowest priority.

The resource allocation prioritizer 120 may determine the resource allocation priority based on the risk scores of the processes. For example, the resource allocation prioritizer 120 may determine the resource allocation priority 122 that indicates that processes that have risk scores that reflect a lower likelihood that the process is a malicious process have a higher priority than processes that have risk scores that reflect a higher likelihood that the process is a malicious process. The resource allocation prioritizer 120 may determine the resource allocation priority based on ranking the processes by risk score, and then determining the priority for allocation resources to the processes based on the ranking of the processes. For example, the resource allocation prioritizer 120 may rank "Process A" with a 0% risk score higher than "Process B" with a 10% risk score, and accordingly, determine "Process A" should have a higher priority for resource allocation than "Process B."

In some implementations, the resource allocation prioritizer 120 may determine the resource allocation priority based on clusters of processes. For example, the resource allocation prioritizer 120 may determine a resource allocation priority that clusters "Process A" with a risk score of 0% and "Process B" with a risk score of 10% in "Cluster A," clusters "Process C" with a risk score of 25%, "Process G" with a risk score of 35%, and "Process D" with a risk score of 40% in "Cluster B," and clusters "Process E" with a risk score of 75% and "Process F" with a risk score of 85% in "Cluster C." The resource allocation prioritizer 120 may prioritize processes in the same cluster similarly. For example, the resource allocation prioritizer 120 may assign a priority of high to processes in "Cluster A," a priority of moderate for processes in "Cluster B," and a priority of low to processes in "Cluster C."

The resource allocation prioritizer 120 may classify processes into clusters based on risk scores. For example, the resource allocation prioritizer 120 may classify "Process A" with a risk score of 0% and "Process B" with a risk score of 10% in a cluster that includes processes with risk scores between 0%-33%. In some implementations, the resource allocation prioritizer 120 may classify processes based on clusters that include a predetermined range of risk scores. For example, a high priority cluster may include processes with risk scores that range from 0-33%, a medium priority cluster may include processes with risk scores that range from 34%-66%, and a low priority cluster may include processes with risk scores that range from 67%-100%. More specifically, the resource allocation prioritizer 120 may perform dynamic clustering using k-means or a similar or modified version of k-means for small datasets. For example, the prioritizer 120 may use the algorithm described in "Dynamic Clustering of Data with Modified K-Means Algorithm" by Ahamed Shafeeq B M and Hareesha K S (http://www.ipcsit.com/vol27/43-ICICN2012-N20017.pdf) or the algorithm described in "A Dynamic Clustering Algorithm Based on Small Data Set" by Tao Peng, Minghua Jiang, and Ming Hu.

In some implementations, the resource allocation prioritizer 120 may classify processes into clusters based on a number of processes executing on the system 100 and a maximum number of processes per cluster. For example, the resource allocation prioritizer 120 may determine that there are twenty processes running and a maximum of four processes per cluster, and in response, determine to classify the twenty processes into five clusters of four processes each, and classify the four processes with the lowest risk scores in the first cluster, the four processes with the next lowest risk scores in the second cluster, etc.

The resource allocation prioritizer 120 may provide the resource allocation priority to the resource allocator 130. For example, the resource allocation prioritizer 120 may provide, to the resource allocator 130, the resource allocation priority 122 that indicates that "Process A" with a risk score of 0% and "Process B" with a risk score of 10% are in "Cluster A" and have a highest priority, "Process C" with a risk score of 25%, "Process G" with a risk score of 35%, and "Process D" with a risk score of 40% are in "Cluster B" and have a moderate priority, and "Process E" with a risk score of 75% and "Process F" with a risk score of 85% are in "Cluster C" with a low priority.

The resource allocator 130 may receive the resource allocation priority and the request, and determine resource allocations. For example, the resource allocator 130 may determine to allocate resources to fulfill the request 112 for Process G if Process G is indicated by the resource allocation priority 122 as having a higher priority than one or more other processes. In another example, the resource allocator 130 may determine not to allocate resources to fulfill the request 112 for Process G if Process G is indicated by the resource allocation priority 122 as having a lower priority than any other process and insufficient remaining resources remain to fulfill the request. In yet another example, the resource allocator 130 may determine to allocate resources to fulfill the request 112 for Process G if Process G is indicated by the resource allocation priority 122 as having a lower priority than all other processes in the resource allocation priority, but sufficient resources remain to fulfill the request.

In response to receiving a request, the resource allocator 130 may determine the resource requested by the response and determine an availability of the resource. For example, in response to receiving the request 112 for 2 GB of main memory, the resource allocator 130 may determine that main memory is requested, and determine that the system 100 has available 6 GB of main memory.

The resource allocator 130 may allocate resources based on whether the availability of the resource requested is sufficient to fulfill the request. For example, the resource allocator 130 may allocate resources in response to the request 112 for 2 GB of main memory based on determining whether 6 GB of main memory available is sufficient to fulfill the request. If the resource allocator 130 determines that the availability of the resource requested is sufficient to fulfill the request, the resource allocator 130 may fulfill the request regardless of the priority of the process making the request as indicated by the resource allocation priority. For example, if the resource allocator 130 determines that the 6 GB of main memory available is sufficient to fulfill the request 112 for 2 GB of main memory from "Process G," the resource allocator 130 may fulfill the request 112 whether "Process G" has a high priority, a medium priority, or a low priority.

If the resource allocator 130 determines that the availability of the resource requested is insufficient to fulfill the request, the resource allocator 130 may allocate resources based on the resource allocation priority. For example, if the resource allocator 130 receives the request 112 for 2 GB of main memory from "Process G" and determines that only 1 GB of main memory is available, the resource allocator 130 may allocate resources based on the resource allocation priority.

When allocating resources based on the resource allocation priority, the resource allocator 130 may determine whether the process requesting the resource has a higher priority than any other processes executing on the system 100. For example, when receiving the request 112 from "Process G" for 2 GB of main memory and determining that only 1 GB of main memory is available, the resource allocator 130 may determine that "Process G" has a higher priority than all of Processes A-F. In another example, when receiving a request from "Process G" for 2 GB of main memory and determining that only 1 GB of main memory is available, the resource allocator 130 may determine that "Process G" has a lower priority than all of Processes A-F.

In response to determining that the process making the request does not have a higher priority than another process executing on the system 100 and the availability of the resource requested is insufficient to fulfill the request, the resource allocator 130 may reject the request or queue the request. For example, in response to determining that "Process G" has a lower priority than all of Processes A-F and that 1 GB of main memory is available but 2 GB of main memory is requested, the resource allocator 130 may reject the request 112 or queue to try fulfilling the request later when more resources become available.

In response to determining that the process making the request has a higher priority than another process executing on the system 100 and the availability of the resource requested is insufficient to fulfill the request, the resource allocator 130 may determine whether reducing a resource allocation of the other process enables the system 100 to fulfill the request from the process. For example, in response to determining that "Process G" has a higher priority than "Process F" and that 1 GB of main memory is available but 2 GB of main memory is requested, the resource allocator 130 may determine whether reducing an allocation of main memory to "Process F" enables the system 100 to fulfill the request 112. Reducing resource allocations to running processes may be a configurable option that is disabled by default.

In some implementation, the system 100 may determine whether reducing the resource allocation to multiple other processes, with a lower priority than the process making the request, in a way that does not comprise integrity or performance of the other processes enables the system 100 to fulfill the request. For example, the system 100 may determine whether reducing the resource allocation to Processes D-F, with a lower priority than "Process G" making the request 112, in a way that does not comprise integrity or performance of Processes D-F enables the request 112 to be fulfilled.

In response to determining that reducing the resource allocation to multiple other processes, with a lower priority than the process making the request, in a way that does not comprise integrity or performance of the other processes does not enable the system 100 to fulfill the request, the resource allocator 130 may reject the request or queue the request. For example, in response to determining that "Process F" is allocated 0.5 GB of main memory and determining that increasing the available main memory by 0.5 GB from 1 GB to 1.5 GB is still insufficient to fulfill the request for 2 GB of main memory, the system 100 may reject the request.

In response to determining that reducing the resource allocation to multiple other processes, with a lower priority than the process making the request, in a way that does not comprise integrity or performance of the other processes enables the system 100 to fulfill the request, the resource allocator 130 may reduce the resource allocation of the other process and fulfill the request. For example, in response to determining that "Process F" is allocated 1.5 GB of main memory and determining that increasing the available main memory by 1 GB from 1 GB to 2 GB is sufficient to fulfill the request 112 for 2 GB of main memory from "Process G," the system 100 may reduce the main memory allocation to "Process F" to 0.5 GB of main memory and allocate 2 GB of main memory to "Process G." In another example, in response to determining that "Process F" is allocated 1 GB of main memory and determining that increasing the available main memory by 1 GB from 1 GB to 2 GB is sufficient to fulfill the request for 2 GB of main memory from "Process G," the system 100 may securely suspend or terminate "Process F," which deallocates 1 GB of main memory from "Process F," and allocate 2 GB of main memory to "Process G." In some implementations, the system 100 may default to not terminating or suspending existing processes but may enable a user to select the option of terminating or suspending existing processes.

In some implementations, the resource allocator 130 may allocate resources based on the clusters of processes indicated by the resource allocation priority. For example, the resource allocator 130 may allocate resources in response to the request 112 from "Process G" based on the clusters indicated in the resource allocation priority 122. The resource allocator 130 may allocate resources based on assigning a similar priority to processes of the same cluster. For example, the resource allocator 130 may receive a resource allocation priority in which "Process G" is indicated as being in "Cluster B" with "Process D," and "Process E" and "Process F" are in "Cluster C" with a lower priority than "Cluster B." Accordingly, even though the resource allocation priority 122 may indicate that "Process D" has a higher risk score than "Process G," the resource allocator 130 may not consider whether reducing a resource allocation to "Process G" would enable the system 100 to fulfill a request.

The resource allocator 130 may determine which processes should execute on the system 100 based on the resource allocations. For example, in response to determining to reduce a resource allocation to "Process F" to fulfill the request from "Process G," the resource allocator 130 may determine to securely suspend or terminate "Process F" resulting in the list 158 of Processes A-E and G shown executing on the system 100. In another example, in response to determining to reject the request 112 from "Process G," the resource allocator 130 may determine to securely suspend or terminate "Process G." As discussed above, whether the resource allocator 130 makes determinations to securely suspend or terminate may be a configurable option that may be disabled by default.

In some implementations, the resource allocator 130 may allocate resources based on a resource allocation priority and whether an amount of resources allocated to processes still enable the processes to execute. For example, in response to determining that 2 GB of main memory requested by "Process G" is not available and that "Process G" has a lower priority than any other process executing on the system 100, the resource allocator 130 may determine that "Process G" can execute with 1 GB of main memory and that 1 GB of main memory is available, and in response, allocate 1 GB of main memory to "Process G." The resource allocator 130 may determine an amount of resources that may be reduced for a process and still enable the process to execute based on querying the process. For example, the resource allocator 130 may determine that "Process G" can execute with only 1 GB of the 2 GB of main memory requested based on querying "Process G" whether 1 GB is sufficient for the process to execute. Additionally or alternatively, the resource allocator 130 may determine an amount of resources that may be reduced for a process and still enable the process to execute based on a predetermined minimum resource allocation. For example, the resource allocator 130 may determine that "Process G" can execute with only 1 GB of the 2 GB of main memory requested based on information stored in a database that indicates that "Process G" can execute with a minimum main memory allocation of 1 GB. In the example, if for some reason "Process G" can not execute as intended, the request for "Process G" may be queued.

In some implementations, the resource allocator 130 may determine the processes to reduce allocation of resources based on the clusters in the resource allocation priority. For example, the resource allocator 130 may determine whether reducing an allocation of resources to processes may enable a request to be fulfilled based on allowing any reduction in resources for a process in a cluster two or more levels below in priority of a cluster of the process making the request, and allowing a reduction in resources to a minimum sufficient for execution for processes in a cluster one level below in priority of a cluster of the process making the request. In some other implementations, the resource allocator 130 may instead allow any reduction in resources for processes in clusters below in priority of a cluster of the process making the request, and allow a reduction in resources to a minimum sufficient for execution of a process that is both (i) in the same cluster as the process making the request and (ii) has a risk score that reflects a greater likelihood of being a malicious process than the process making the request.

Figure 1C:
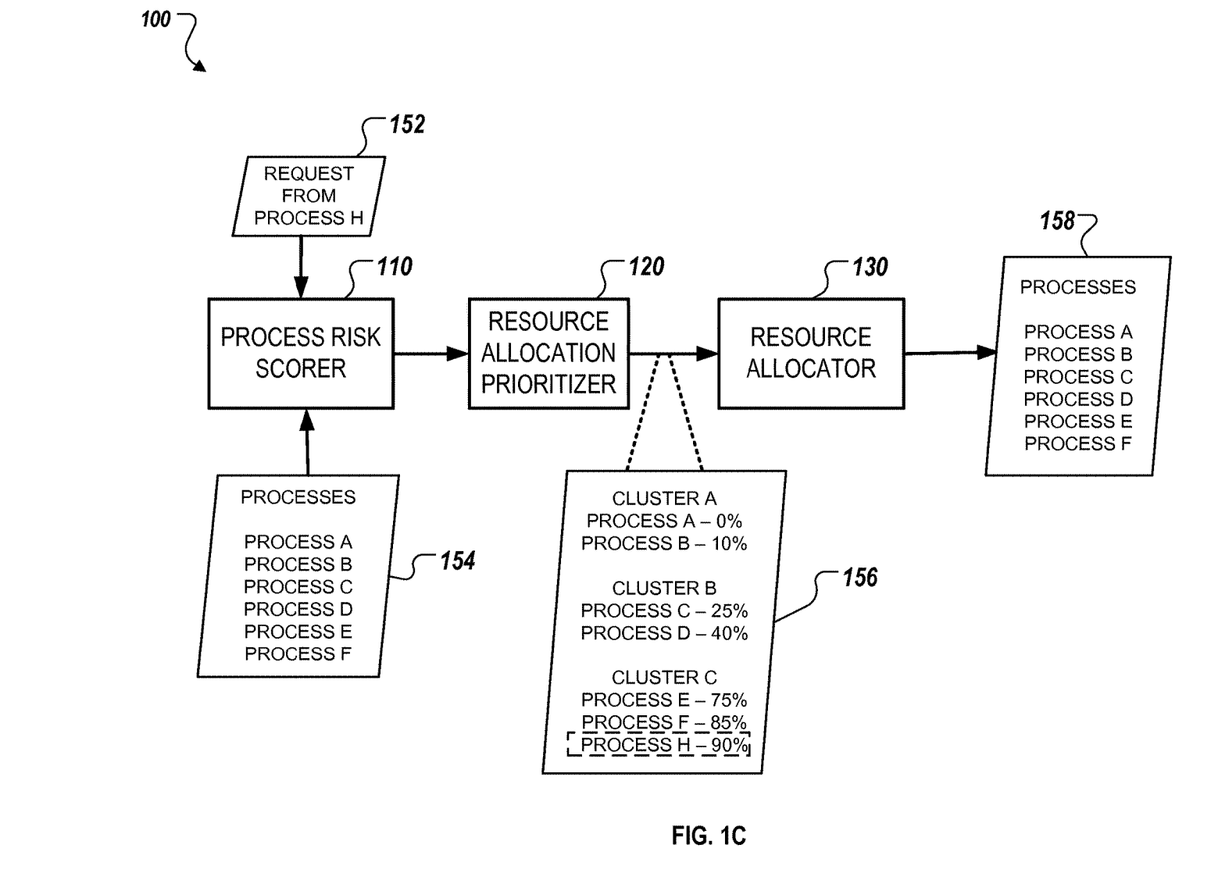

FIG. 1C is a block diagram of the example system 100 for allocating resources to processes based on security risk. However, FIG. 1C illustrates that when the request 152 is received from "Process H" that has a risk score that reflects a higher likelihood that the process is a malicious process than a likelihood of any other process executing on the system 100, the request 152 may be rejected or queued.

As shown, the process risk scorer 110 may receive the request 152 from "Process H." For example, the process risk scorer 110 may receive the request 152 from "Process H" to use 10% of a network traffic bandwidth of the system 100. In response to receiving the request 152, the process risk scorer 110 may identify the other processes executing on the system 100 and determine a risk score for all of the processes. For example, the process risk scorer 110 may identify in a list 154 that Processes A-F are executing on the system 100 and determine risk scores of 0%, 10%, 25%, 40%, 75%, and 85% for "Processes A-F," respectively, and a risk score of 90% for "Process H."

As discussed above, in some implementations, in response to a request from a process, the process risk scorer 110 may provide just a risk score for the process to the resource allocation prioritizer 120 which may already maintain a list of existing processes already running and their associated risk scores, where the risk scores of the existing processes may have previously been provided by the process risk scorer 110 when those existing processes provided requests for resources. For example, in response to the request 152 from "Process H," the process risk scorer 110 may just provide a risk score of 90% for "Process H," where the process risk scorer 110 previously provided risk scores of 0%, 10%, 25%, 40%, 75%, 85% for Processes A-F in response to requests previously received from Processes A-F.

The resource allocation prioritizer 120 may receive the request 152, indications of processes, and risk scores, and determine a resource allocation priority 156. For example, the resource allocation prioritizer 120 may rank the processes by risk score and determine that "Process H" has the lowest priority as it has a risk score that reflects a greatest likelihood of the process being a malicious process.

The resource allocator 130 may allocate resources based on the resource allocation priority 156. For example, the resource allocator 130 may determine that the request 152 is for 10% of the network traffic bandwidth of the system 100, determine that 5% of the network traffic bandwidth of the system 100 is available, determine that the request 152 is for "Process H" which has a lowest priority as indicated by the resource allocation priority 156, and determine to reject or queue the request, resulting in the list 158 of Processes A-F shown executing on the system 100.

Figure 2:
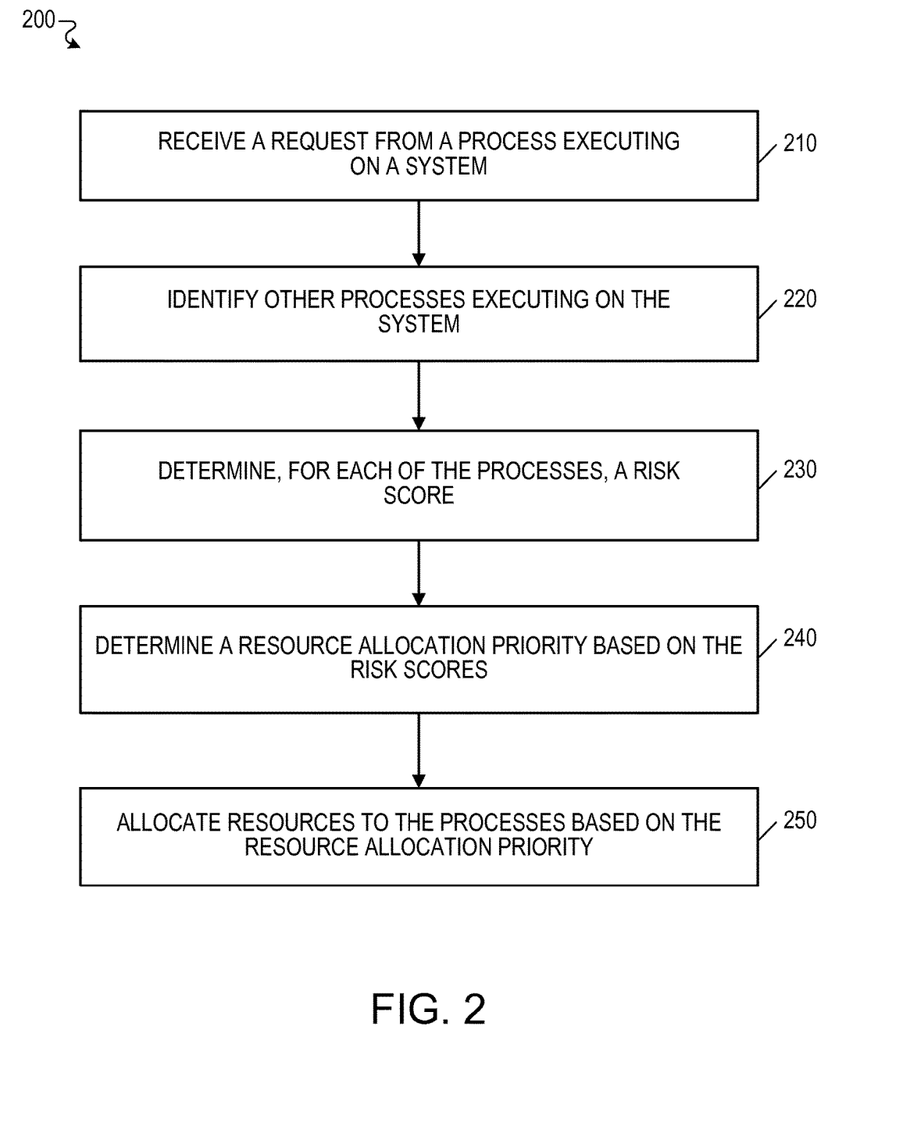
FIG. 2 is a flowchart of an example process for allocating resources to processes based on security risk.

FIG. 2 is a flowchart of an example process 200 for allocating resources to processes based on security risk. The following describes the process 200 as being performed by components of the system 100 that are described with reference to FIGS. 1A-1C. However, the process 200 may be performed by other systems or system configurations.

The process 200 may include receiving a request from a process executing on the system (210). For example, the process risk scorer 110 may receive a request from "Process G" for 20% of a CPU utilization.

The process 200 may include, in response to receiving the request from the process, identifying other processes executing on the system (220). For example, in response to receiving a request from "Process G" for 20% of a CPU utilization, the process risk scorer 110 may identify Processes A-F are executing on the system 100.

The process 200 may include determining, for each of the processes, a risk score (230). For example, the process risk scorer 110 may determine a risk score of 0%, 10%, 25%, 35%, 40%, 75%, and 85% for processes A-C, G, and D-F, respectively.

In other example, in response to receiving a request from "Process G" for 20% of a CPU utilization, the process risk scorer 110 may determine a risk score of 40% for "Process G" and provide the risk score to the resource allocation prioritizer 120. The resource allocation prioritizer 120 may then determine that Processes A-C and D-F are already executing on the system 100 and have associated risk scores of 0%, 10%, 25%, 35%, 75%, and 85%, respectively, previously determined by the process risk scorer 110.

The process 200 may include determining a resource allocation priority based on the risk scores (240). For example, the resource allocation prioritizer 120 may determine to classify "Process A" and "Process B" into "Cluster A" based on determining the corresponding risk scores of 0% and 10% fall within a range of 0% to 33% of "Cluster A," determine to classify "Process C," "Process G," and "Process D" into "Cluster B" based on determining the corresponding risk scores of 25%, 35%, and 40% fall within a range of 34% to 66% of "Cluster B," determine to classify "Process E" and "Process F" into "Cluster C" based on determining the corresponding risk scores of 75% and 85% fall within a range of 67% to 100% of "Cluster C," determine that Cluster A has a high priority, Cluster B has a moderate priority, and Cluster C has a low priority, and generate a resource allocation priority based on the determined clusters and determined priorities.

The process 200 may include allocating resources to the processes based on the resource allocation priority (250). For example, the resource allocator 130 may receive the request from "Process G" for 20% of CPU utilization, determine that only 10% of CPU utilization is available, determine that "Process E" and "Process F" both have a lower priority for resource allocation than "Process G," determine that both "Process E" and "Process F" are using 8% of CPU utilization, determine that reducing the CPU utilization of both "Process E" and "Process F" to 3% would enable the request to be fulfilled in a way that does not comprise integrity or performance of "Process E" and "Process F," reduce the CPU utilization allocated to "Process E" and "Process F" to 3%, and allocate 20% CPU utilization to "Process G."

Figure 3:
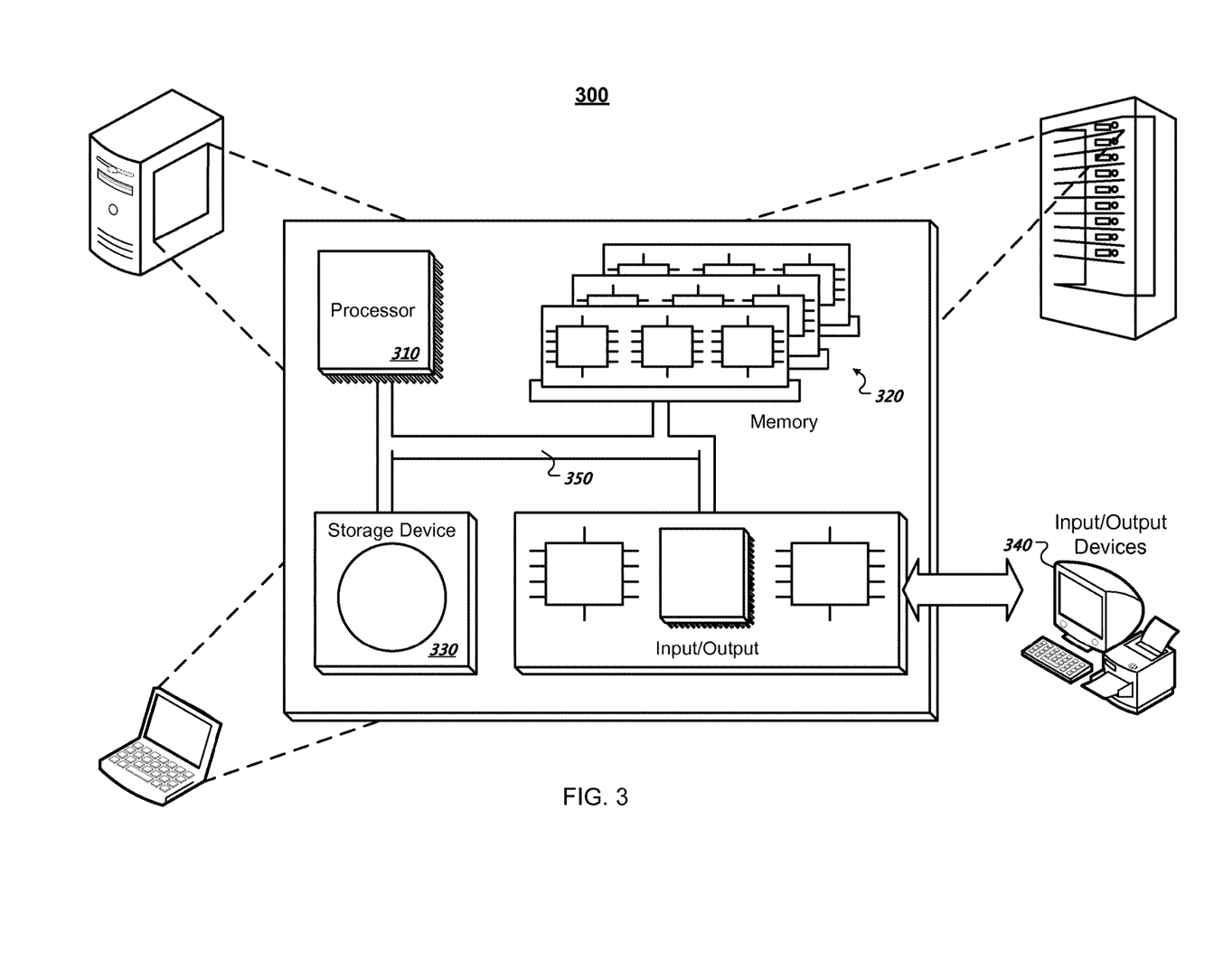
FIG. 3 illustrates a schematic diagram of an exemplary computer system.

FIG. 3 illustrates a schematic diagram of an exemplary computer system. The system 300 can be used for the operations described in association with the processes 200 according to some implementations. The system 300 may be included in the system 100.

The system 300 includes a processor 310, a memory 320, a storage device 330, and an input/output device 340. Each of the components 310, 320, 330, and 320 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 800. In one implementation, the storage device 330 is a computer-readable medium. In various different implementations, the storage device 330 may be a floppy disk device, a hard disk device, an optical disk device, or a tape device.

The input/output device 340 provides input/output operations for the system 800. In one implementation, the input/output device 340 includes a keyboard and/or pointing device. In another implementation, the input/output device 340 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them. In some cases, the one or more programmable computers may be connected by a network to form a distributed computing environment (e.g., a cloud).

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method comprising:
    receiving a request from a process executing on a system for an allocation of a portion of a resource;
    identifying other processes that are already executing on the system and that have already been allocated one or more respective portions of the resource;
    determining, for each of the processes, a risk score that reflects a likelihood that the process is a malicious process;
    determining, for each of the processes and based on the risk scores of the process, a resource allocation priority that reflects a rank, among all of the processes, with which a resource allocator is to allocate portions of the resource; and
    allocating, by the resource allocator, the portions of the resource to the processes based on the request and according to the resource allocation priority that reflects, for each of the processes, the rank with which the resource allocator is to allocate the portions of the resource.

2. The method of claim 1, wherein allocating, by the resource allocator, the portions of the resource to the processes based on the request and according to the resource allocation priority that reflects, for each of the processes, the rank with which the resource allocator is to allocate the portions of the resource comprises:
    determining an availability of the portions of the resource on the system; and
    allocating the portions of the resource to the processes based on the availability of the portions of the resource on the system and the resource allocation priority.

3. The method of claim 2, wherein allocating the portions of the resource to the processes based on the availability of the portions of the resource on the system and the resource allocation priority comprises:
    determining that the availability of the portions of the resource on the system is insufficient to fulfill the request and maintain an allocation of the portions of the resource for the other processes;
    in response to determining that the availability of the portions of the resource on the system is insufficient to fulfill the request and maintain an allocation of the portions of the resource for the other processes, determining that the resource allocation priority indicates that the process has a lower priority than the other processes; and
    in response to determining that the resource allocation priority indicates that the process has a lower priority than the other processes, rejecting or queuing the request from the process.

4. The method of claim 2, wherein allocating the portions of the resource to the processes based on the availability of the portions of the resource on the system and the resource allocation priority comprises:
    determining that the availability of the portions of the resource on the system is insufficient to fulfill the request and maintain an allocation of the portions of the resource for the other processes;

in response to determining that the availability of the portions of the resource on the system is insufficient to fulfill the request and maintain an allocation of the portions of the resource for the other processes, determining that the resource allocation priority indicates that the process has a higher priority than another process;

in response to determining that the resource allocation priority indicates that the process has a higher priority than another process, determining whether reducing a resource allocation of the other process enables the system to fulfill the request from the process; and in response to determining that reducing the resource allocation of the other process enables the system to fulfill the request from the process:
    reducing the resource allocation of the other process without causing integrity or security concerns; and
    fulfilling the request from the process.

5. The method of claim 4, wherein reducing the resource allocation of the other process comprises:
    suspending or securely terminating the other process.

6. The method of claim 1, wherein determining, for each of the processes and based on the risk scores of the process, a resource allocation priority that reflects a rank, among all of the processes, with which a resource allocator is to allocate portions of the resource comprises:
    determining a resource allocation priority that prioritizes resource allocation for processes with risk scores that reflect a low likelihood that the process is a malicious process over processes with risk scores that reflect a high likelihood that the process is a malicious process.

7. The method of claim 1, wherein determining, for each of the processes and based on the risk scores of the process, a resource allocation priority that reflects a rank, among all of the processes, with which a resource allocator is to allocate portions of the resource comprises:
    classifying the processes into clusters based on the risk scores; and
    determining the resource allocation priority based on the clusters.

8. A system comprising:
one or more computers; and
one or more storage devices storing instructions that are operable, when executed by the one or more computers, to cause the one or more computers to perform operations comprising:
    receiving a request from a process executing on a system for an allocation of a portion of a resource;
    identifying other processes that are already executing on the system and that have already been allocated one or more respective portions of the resource;
    determining, for each of the processes, a risk score that reflects a likelihood that the process is a malicious process;
    determining, for each of the processes and based on the risk scores of the process, a resource allocation priority that reflects a rank, among all of the processes, with which a resource allocator is to allocate portions of the resource; and
    allocating, by the resource allocator, the portions of the resource to the processes based on the request and according to the resource allocation priority that reflects, for each of the processes, the rank with which the resource allocator is to allocate the portions of the resource.

9. The system of claim 8, wherein allocating, by the resource allocator, the portions of the resource to the processes based on the request and according to the resource allocation priority that reflects, for each of the processes, the rank with which the resource allocator is to allocate the portions of the resource comprises:
    determining an availability of the portions of the resource on the system; and
    allocating the portions of the resource to the processes based on the availability of the portions of the resource on the system and the resource allocation priority.

10. The system of claim 8, wherein allocating the portions of the resource to the processes based on the availability of the portions of the resource on the system and the resource allocation priority comprises:
    determining that the availability of the portions of the resource on the system is insufficient to fulfill the request and maintain an allocation of the portions of the resource for the other processes;
    in response to determining that the availability of the portions of the resource on the system is insufficient to fulfill the request and maintain an allocation of the portions of the resource for the other processes, determining that the resource allocation priority indicates that the process has a lower priority than the other processes; and
    in response to determining that the resource allocation priority indicates that the process has a lower priority than the other processes, rejecting or queuing the request from the process.

11. The system of claim 8, wherein allocating the portions of the resource to the processes based on the availability of the portions of the resource on the system and the resource allocation priority comprises:
    determining that the availability of the portions of the resource on the system is insufficient to fulfill the request and maintain an allocation of the portions of the resource for the other processes;
    in response to determining that the availability of the portions of the resource on the system is insufficient to fulfill the request and maintain an allocation of the portions of the resource for the other processes, determining that the resource allocation priority indicates that the process has a higher priority than another process;
    in response to determining that the resource allocation priority indicates that the process has a higher priority than another process, determining whether reducing a resource allocation of the other process enables the system to fulfill the request from the process; and
    in response to determining that reducing the resource allocation of the other process enables the system to fulfill the request from the process:
        reducing the resource allocation of the other process without causing integrity or security concerns; and
        fulfilling the request from the process.

12. The system of claim 11, wherein reducing the resource allocation of the other process comprises:
    suspending or securely terminating the other process.

13. The system of claim 8, wherein determining, for each of the processes and based on the risk scores of the process, a resource allocation priority that reflects a rank, among all of the processes, with which a resource allocator is to allocate portions of the resource comprises:
    determining a resource allocation priority that prioritizes resource allocation for processes with risk scores that reflect a low likelihood that the process is a malicious process over processes with risk scores that reflect a high likelihood that the process is a malicious process.

14. The system of claim 8, wherein determining, for each of the processes and based on the risk scores of the process, a resource allocation priority that reflects a rank, among all of the processes, with which a resource allocator is to allocate portions of the resource comprises:
   classifying the processes into clusters based on the risk scores; and
   determining the resource allocation priority based on the clusters.

15. A non-transitory computer-readable medium storing software comprising instructions executable by one or more computers which, upon such execution, cause the one or more computers to perform operations comprising:
   receiving a request from a process executing on a system for an allocation of a portion of a resource;
   identifying other processes that are already executing on the system and that have already been allocated one or more respective portions of the resource;
   determining, for each of the processes, a risk score that reflects a likelihood that the process is a malicious process;
   determining, for each of the processes and based on the risk scores of the process, a resource allocation priority that reflects a rank, among all of the processes, with which a resource allocator is to allocate portions of the resource; and
   allocating, by the resource allocator, the portions of the resource to the processes based on the request and according to the resource allocation priority that reflects, for each of the processes, the rank with which the resource allocator is to allocate the portions of the resource.

16. The medium of claim 15, wherein allocating, by the resource allocator, the portions of the resource to the processes based on the request and according to the resource allocation priority that reflects, for each of the processes, the rank with which the resource allocator is to allocate the portions of the resource comprises:
   determining an availability of the portions of the resource on the system; and
   allocating the portions of the resource to the processes based on the availability of the portions of the resource on the system and the resource allocation priority.

17. The medium of claim 15, wherein allocating the portions of the resource to the processes based on the availability of the portions of the resource on the system and the resource allocation priority comprises:
   determining that the availability of the portions of the resource on the system is insufficient to fulfill the request and maintain an allocation of the portions of the resource for the other processes;
   in response to determining that the availability of the portions of the resource on the system is insufficient to fulfill the request and maintain an allocation of the portions of the resource for the other processes, determining that the resource allocation priority indicates that the process has a lower priority than the other processes; and
   in response to determining that the resource allocation priority indicates that the process has a lower priority than the other processes, rejecting or queuing the request from the process.

18. The medium of claim 15, wherein allocating the portions of the resource to the processes based on the availability of the portions of the resource on the system and the resource allocation priority comprises:
   determining that the availability of the portions of the resource on the system is insufficient to fulfill the request and maintain an allocation of the portions of the resource for the other processes;
   in response to determining that the availability of the portions of the resource on the system is insufficient to fulfill the request and maintain an allocation of the portions of the resource for the other processes, determining that the resource allocation priority indicates that the process has a higher priority than another process;
   in response to determining that the resource allocation priority indicates that the process has a higher priority than another process, determining whether reducing a resource allocation of the other process enables the system to fulfill the request from the process; and
   in response to determining that reducing the resource allocation of the other process enables the system to fulfill the request from the process:
      reducing the resource allocation of the other process without causing integrity or security concerns; and
      fulfilling the request from the process.

19. The medium of claim 18, wherein reducing the resource allocation of the other process comprises:
   suspending or securely terminating the other process.

20. The medium of claim 15, wherein determining, for each of the processes and based on the risk scores of the process, a resource allocation priority that reflects a rank, among all of the processes, with which a resource allocator is to allocate portions of the resource comprises:
   determining a resource allocation priority that prioritizes resource allocation for processes with risk scores that reflect a low likelihood that the process is a malicious process over processes with risk scores that reflect a high likelihood that the process is a malicious process.

* * * * *

UNITED STATES PATENT AND TRADEMARK OFFICE
CERTIFICATE OF CORRECTION

| | |
|---|---|
| PATENT NO. | : 9,798,877 B2 |
| APPLICATION NO. | : 14/838855 |
| DATED | : October 24, 2017 |
| INVENTOR(S) | : Shaan Mulchandani |

It is certified that error appears in the above-identified patent and that said Letters Patent is hereby corrected as shown below:

In the Specification

In Column 1, Line 8, delete "Jun. 4, 2014," and insert --June 4, 2015,--, therefor.

Signed and Sealed this
Tenth Day of April, 2018

Andrei Iancu
*Director of the United States Patent and Trademark Office*